United States Patent [19]
Obenschain

[11] 3,890,565
[45] June 17, 1975

[54] MEASURING CORE REDUCTANCE
[75] Inventor: Arthur W. Obenschain, Silver Spring, Md.
[73] Assignee: The United States of America as represented by the Secretary of the Navy, Washington, D.C.
[22] Filed: Apr. 25, 1960
[21] Appl. No.: 24,634

[52] U.S. Cl. ............................................. 324/43 R
[51] Int. Cl. .......................................... G01r 33/02
[58] Field of Search .......... 324/47, 14, 43, 48; 73/1, 73/153

[56] References Cited
UNITED STATES PATENTS
| | | | |
|---|---|---|---|
| 2,491,736 | 12/1949 | Irwin | 324/43 |
| 2,958,819 | 11/1960 | Bregar | 324/43 |

Primary Examiner—Maynard R. Wilbur
Assistant Examiner—G. E. Montone
Attorney, Agent, or Firm—R. S. Sciascia; J. A. Cooke

EXEMPLARY CLAIM

1. A method for measuring the reductance of cores in a total field magnetometer wherein the magnetometer is placed in a constant, unidirectional magnetic field of a predetermined value, the magnetometer comprising three pairs of previously matched orthogonally arranged cores, the first pair of matched cores being parallel to the magnetic field, the second and third pair of matched cores being perpendicular to the magnetic field, which comprises the steps of (1) substituting for one of the cores of the second pair of matched cores a different core which is to be tested, (2) applying calibrated magnetic fields parallel to the first pair of cores to produce a first effect on the magnetometer, (3) rotating the magnetometer 90° from an original position about an axis parallel to the third pair of cores to produce a second effect on the magnetometer, (4) rotating the magnetometer 90° back to the original position thereof and (5) measuring the difference between the first and second effects whereby the difference measurement is indicative of said different core reductance.

4 Claims, 4 Drawing Figures

PATENTED JUN 17 1975  3,890,565

INVENTOR.
A. W. OBENSCHAIN
BY W. O. Duesenberry
D. Hodge ATTYS.
A. M. Lowe AGT.

MEASURING CORE REDUCTANCE

The invention described herein may be manufactured and used by or for the Government of the United States of America for governmental purposes without the payment of any royalties thereon or therefor.

This invention relates to the measurement of magnetic core inductance, and more particularly to the measuring of the reductance of cores.

The inductance of a wire coil wrapped around a magnetic core varies with the strength of the magnetic field passing through core along the axis thereof. In the manufacture of total field magnetometers it is necessary to determine very accurately the full field reductance of Permalloy or other high permeability magnetic material cored coils to easily indicate the degree of match therebetween. Full field reductance is defined as the difference in the value of inductance of a coil when subjected to a 600 milligauss magnetic field from the value of inductance of that coil when subjected to a zero magnetic field.

Prior methods of measuring reductance are disadvantageous because they were time consuming and tedious. Also, the prior measuring techniques are not especially suited for use on cores to be used in magnetometers because errors resulted due to differences in the measuring environment and the environment in which such cores were employed.

The present invention contemplates obviating the disadvantages of the prior techniques by testing the cores in a magnetometer block. This is accomplished by utilizing a total field magnetometer having the six cores thereof previously matched. One of the cores is replaced by the core to be tested and the magnetometer is placed in a constant magnetic field. A calibrated field is applied to the magnetometer and removed causing a certain effect or signal to be produced. The magnetometer is then rotated 90° with respect to the field so that the background field along the test core varies from zero to the value of the constant field. The signal produced when the magnetometer has been rotated 90° is compared to the calibration signal and the reductance of the tested core is thereby determined.

One of the objects of the present invention is to provide a new and improved method of measuring core reductance.

Another object of this invention is to provide a method of measuring core reductance with an exceptionally high degree of accuracy.

A further object of this invention is to provide a simpler and easier method of measuring core reductance.

An additional object of this invention is to provide a method for measuring core reductance in the exact environment in which the core is to be used.

Other objects and advantages of the invention will hereinafter become more fully apparent from the following description of the annexed drawing, which illustrate a preferred method of practicing the invention, and wherein.

Figure 1:
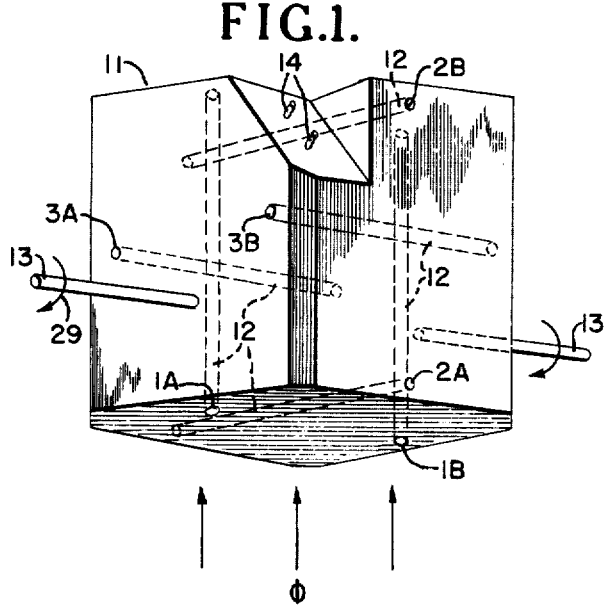
FIG. 1 is a perspective view of the magnetometer.

Referring now to the drawing, wherein like reference characters designate like or corresponding parts throughout the several views, there is shown in FIG. 1 an illustration of magnetometer 11 having 3 pairs of orthogonally arranged cores 12. Cores 1A and 1B which comprise core pair number one are initially parallel to a unidirectional, constant magnetic field $\phi$, while cores 2A, 2B, 3A and 3B are perpendicular to the field. The cores of each core pair are parallel to each other and each core pair is in a plane perpendicular to the other two core pairs. The full field reductance of core pair number one must be equal to the full field reductance of core pair number two. For added accuracy the full field reductance of core pair number three should be equal to that of core pairs one and two. It is also desirable that the full field reductance of each core making up a particular pair not differ from the other core in that pair by more than a particular value e.g. 0.5 microhenry. When all of these conditions have been satisfied, the cores may be considered matched. The magnetometer 11, is rotated about a line parallel to cores 3A and 3B by a shaft 13 made of suitable material. The shaft is turned about its axis by an appropriately located motor or it may be turned by hand. The magnetometer is secured to shaft 13 by any appropriate clamping means.

Figure 2:
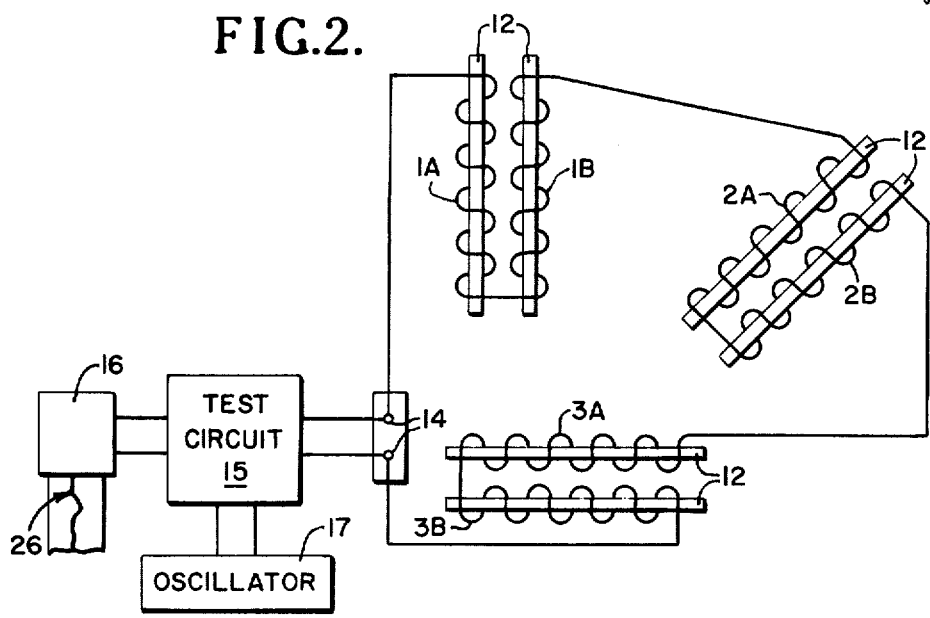
FIG. 2 is a circuit diagram of the magnetometer and the test apparatus.

The assembled magnetometer block is connected to test circuit 15, as shown in FIG. 2. As shown in this figure, all of the coils are series connected between terminals 14. The external terminals 14 of the magnetometer are connected to a test circuit 15. The circuit 15 comprises an inductance bridge which is connected to terminals 14. The bridge is supplied by any suitable a.c. source 17, which may be a 3,000 cycle well regulated oscillator. The bridge is adjusted to a slight unbalance so that the a.c. voltage from source 17 is transmitted to an a.c. amplifier. The output of the a.c. amplifier is rectified and fed to a d.c. amplifier and recording milliammeter 16. The input to the d.c. amplifier is balanced with a bucking voltage, equal approximately to the average value of the rectifier output so that high sensitivity will be achieved. This apparatus is identical to that used for assembly tests on the total field magnetometer, as a comparison with application Serial No. 763,758, filed Sept. 26, 1958 by Arthur W. Obenschain will reveal.

Figure 4:
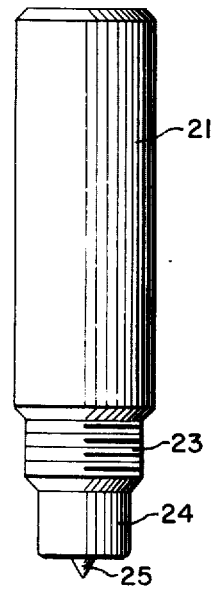
FIG. 4 is a greatly enlarged side view of a "combination" plug.

To facilitate installation of the cores to be tested, a "combination" plug as shown in FIG. 4 is utilized. The combination plug is to be used instead of the standard screw plug, rubber washer, and end plug shown in FIG. 2 of the aforementioned application Ser. No. 763,758. The combination plug comprises a cylinder 21 having a shaft with a threaded portion 23 and an unthreaded portion 24 located at one end of the cylinder. The threaded portion 23 is adapted to engage a corresponding threaded portion (not shown) within the bores on the magnetometer block 11. A tit 25 is formed at one end of the combination plug. After the core to be tested is inserted in the magnetometer the combination plug secures it in place. This plug is screwed in the magnetometer until tit 25 contacts the interior wall of the alundum tube in which the thin tubular Permalloy core is mounted. This tube is fitted within the coil form that carries the coil of wire. The aforementioned application Ser. No. 763,758 clearly shows the relationship between the core and the apparatus normally used to maintain it in place within the magnetometer.

The method of testing core reductance will now be described in greater detail. The magnetometer having matched cores is inserted in a constant, unidirectional magnetic superposed field of predetermined magnitude e.g. 600 milligauss. This field may be established by any well known apparatus. The magnetometer block is arranged so that core pair one consisting of cores 1A and 1B is parallel to the field while core pairs two and three are perpendicular to the field. Recording milliammeter 16 is calibrated in terms of milligauss by changing the superposed field a known amount and observing the effect on the magnetometer by the resulting change in the milliammeter deflection. The gain of the d.c. amplifier, in test circuit 15, is changed as required to obtain proper scale readings for the recording milliammeter. Matched or standard core 2B is removed and replaced with a different core that is to be tested thus forming a test block. The core that is to be tested is secured in place by threading the combination plug of FIG. 4 into the block 11. Of course, if a combination plug is not available the standard apparatus may be used to secure the core in place.

Figure 3:
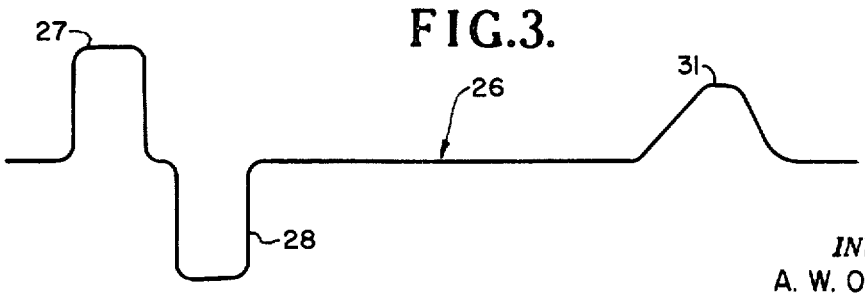
FIG. 3 is a record produced by the test apparatus when the cores are being tested.

The magnetometer test block is now calibrated by superimposing positive and negative predetermined magnetic signals on the previously established unidirectional, constant, magnetic field within which the unit 11 is disposed. This produces an effect on the magnetometer which results in deflections 27 and 28 on the record 26 shown in FIG. 3 produced by recorder 16.

After the calibrated signals have been removed, shaft 13, FIG. 1, is rotated 90° in the direction indicated by arrow 29 resulting in a similar rotation of the test block about a line parallel to cores 3A and 3B. This causes cores 2A and 2B to be rotated from a position perpendicular to the superposed magnetic field to a position parallel to that field, i.e. from a position where the cores have zero background field to a position where the cores have a background field equal to the superposed field. When the magnetometer is rotated, cores 1A and 1B are rotated from a position parallel to the superposed magnetic field to a position perpendicular to the field while cores 3A and 3B remain perpendicular to the field. The magnetometer is then rotated back to the original position by rotating shaft 13 90° in the direction opposite to arrow 29. This reverse rotation of the magnetometer serves two useful, although not essential, purposes. Firstly, it conveniently repositions the magnetometer for removal of the tested core and convenient insertion of the next core to be tested. And secondly, it provides a convenient visual check to determine whether or not the test circuit has drifted during the course of the test; drift being indicated by the failure of the stylus tracing the record 26 to return to its undeflected position when the magnetometer has been rotated back to its original position. Of course it is to be understood that the original rotation could be 90° in the direction opposite that shown by arrow 29.

Record 26 produced by recording milliammeter 16 is now examined to determine the effect produced on the test block when it is rotated 90°. The deflection 31 indicates that the reductance of the test core is of the same polarity with reference to the standard core as the calibrated signal that produced deflection 27. Of course it is to be understood that if deflection 31 was in the opposite direction to that shown on the drawing the test core reductance would be of the same polarity with reference to the standard core as the signal that produced deflection 28. The magnitude of the core reductance is ascertained with reference to the standard core by measuring the difference between deflections 27 and 31. If deflection 31 equals that of deflection 27 it is known that the test core reductance differs from the reductance of the standard core which it replaced by an amount equal to the calibration signal. On the other hand, if there is no deflection 31 it is known that the test core reductance equals that of the standard core. If the deflection is any other amount the difference between the test core and standard core reductance can be determined by proportioning the calibrated signal deflection 27 or 28 with the test core deflection 31. In this manner the reductance of a large number of cores relative to the standard core may be determined easily and with a minimum of cost.

It is thus seen that a new, improved and more accurate method of measuring core reductance has been disclosed in this application.

Obviously many modifications and variations of the present invention are possible in light of the above teachings. Although certain specific parameters have been set forth to aid in a complete understanding of the apparatus used to accomplish this method, it is understood that any suitable values may be utilized. It is therefore to be understood that within the scope of the appended claims the invention may be practiced otherwise than as specifically described.

What is claimed as new and desired to be secured by Letters Patent of the United States is:

1. A method for measuring the reductance of cores in a total field magnetometer wherein the magnetometer is placed in a constant, unidirectional magnetic field of a predetermined value, the magnetometer comprising three pairs of previously matched orthogonally arranged cores, the first pair of matched cores being parallel to the magnetic field, the second and third pair of matched cores being perpendicular to the magnetic field, which comprises the steps of (1) substituting for one of the cores of the second pair of matched cores a different core which is to be tested, (2) applying calibrated magnetic fields parallel to the first pair of cores to produce a first effect on the magnetometer, (3) rotating the magnetometer 90° from an original position about an axis parallel to the third pair of cores to produce a second effect on the magnetometer, (4) rotating the magnetometer 90° back to the original position thereof and (5) measuring the difference between the first and second effects whereby the difference measurement is indicative of said different core reductance.

2. A method for measuring the reductance of cores wherein a plurality of matched orthogonal cores are in a constant magnetic field which comprises the steps of (1) substituting for one of the matched cores a different core which is to be tested thus forming a test block, (2) applying calibrated magnetic fields to said block to produce a first effect therein, (3) rotating said block and said different core 90° from an original position with respect to the constant field about an axis perpendicular to said different core to produce a second effect therein and (4) measuring the difference between the first and second effects, whereby the difference measurement is indicative of said different core reductance.

3. The method of claim 2 wherein said block is rotated back to the original position thereof.

4. A method of measuring the reductance of cores in a total field magnetometer wherein the magnetometer is placed in a constant, unidirectional magnetic field of a predetermined value, the magnetometer comprising an arrangement of three pairs of orthogonally arranged cores, the first pair of cores being placed parallel to the magnetic field, the second and third pairs of matched cores being placed perpendicular to the magnetic field which comprises the steps of (1) placing three pairs of reductance matched cores in the orthogonal arrangement of the magnetometer, (2) replacing one of the cores of the second pair of reductance matched cores with a different core to be tested, (3) applying a calibrated magnetic field parallel to the first pair of cores to produce a first effect on the magnetometer, (4) rotating the magnetometer 90° from an original position about an axis parallel to the third pair of cores to produce a second effect on the magnetometer, (5) rotating the magnetometer 90° back to the original position thereof, and (6) measuring the difference between the first and second effects whereby the difference measurement is indicative of the reductance of said different core.

* * * * *